United States Patent
Agrawal

(10) Patent No.: US 8,005,216 B1
(45) Date of Patent: Aug. 23, 2011

(54) METHOD AND APPARATUS PROVIDING CONFIDENTIALITY, INTEGRITY AND AUTHENTICITY FOR A VIDEO FILE

(75) Inventor: Sunil Agrawal, Milpitas, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1035 days.

(21) Appl. No.: 11/842,709

(22) Filed: Aug. 21, 2007

(51) Int. Cl.
*H04N 7/167* (2011.01)
(52) U.S. Cl. ...................................... 380/200
(58) Field of Classification Search .................. 380/200
See application file for complete search history.

(56) References Cited

U.S. PATENT DOCUMENTS

| 7,055,166 B1 | 5/2006 | Logan et al. | |
| 2008/0013724 A1* | 1/2008 | Shamoon et al. | 380/201 |
| 2008/0069350 A1* | 3/2008 | Reinoso et al. | 380/200 |

* cited by examiner

*Primary Examiner* — Kambiz Zand
*Assistant Examiner* — Aubrey H Wyszynski
(74) *Attorney, Agent, or Firm* — Kilpatrick Townsend & Stockton LLP

(57) ABSTRACT

A method, apparatus and computer program product for providing confidentiality, integrity and authenticity for a video file is presented. An encryption header is produced for the video file, the video file including a plurality of packets that carry content, the encryption header containing information necessary to successfully decrypt the video file. The encryption header is added to the video file. An encryption key is generated from a master key identified in the encryption header and, using the encryption key, individual packets of the video file that carry content are encrypted. The video file comprises one of the group consisting of pre-recorded streaming video, live streaming video and randomly accessed video.

27 Claims, 5 Drawing Sheets

METHOD AND APPARATUS PROVIDING CONFIDENTIALITY, INTEGRITY AND AUTHENTICITY FOR A VIDEO FILE

BACKGROUND

Video files have become ubiquitous. One popular type of file format used for video files is Flash Video (FLV). FLV is a proprietary file format used to deliver video over the Internet. Flash Video is viewable on most operating systems, via the widely available Adobe Flash Player™ and web browser plugin, or one of several third-party programs. The Adobe Flash Player is a multimedia and application player developed and distributed by Adobe Systems, Incorporated of San Jose, Calif. Because the Flash Player runs as a browser plug-in, it is possible to embed Flash Video in web pages and view the video within a web browser. Audio in Flash Video files is usually encoded as Moving Picture Experts Group audio layer 3 (MP3). FLV files also support uncompressed audio or Adaptive Differential Pulse Code Modulation (ADPCM) format audio.

Compared to other plug-ins such as Java, Acrobat Reader, QuickTime or Windows Media Player, the Flash Player has a small install size, quick download time, and fast initialization time.

Since its introduction, Flash technology has become a popular method for adding animation and interactivity to web pages; several software products, systems, and devices are able to create or display Flash. Flash is commonly used to create animation, advertisements, various web-page components, to integrate video into web pages, and more recently, to develop rich Internet applications.

Many websites rely on Flash being available by default on a user's web browser and will not check to see if it is available. If Flash is not installed, users may be unable to access some Flash-dependent websites or site features. These sites sometimes depend on a fast Internet connection, especially a highly complex website or one with music. While it is not impossible to see Flash-based sites with a slower form of Internet, such as dial-up, or a slow form of Digital subscriber Loop (DSL), it may be frustrating for the user. Blocking tools generally do alert the end user to the fact that Flash content is present on the site, allowing the user to view it if they wish.

Flash is increasingly used as a way to display video clips on web pages. The Adobe Flash Player is a dedicated browser plugin (also available as standalone player) and offers very good platform compatibility compared to other browser plugins. It is available for many popular platforms, including Windows, Mac OSX and—to some extent—Linux. Flash is used as the basis for many popular video sites, including YouTube and Google Video Flash as a format has become very widespread on the desktop market. Flash players exist for a wide variety of different systems and devices. Flash content can run consistently on Microsoft Windows, Mac OS, and Linux.

Of late, Flash libraries are being used with the XML capabilities of the browser to render rich content in the browser. Since Flash provides more comprehensive support for vector graphics than the browser and because it provides a scripting language geared towards interactive animations, it is considered a viable addition to the capabilities of a browser.

Many times, Flash authors will decide that while they desire the advantages that Flash affords them in the areas of animation and interactivity, they do not wish to expose their images and/or code to the world. However, once an .swf file is saved locally, it may then quite easily be decompiled into its source code and assets. Some decompilers are capable of nearly full reconstruction of the original source file, down to the actual code that was used during creation.

In opposition to the decompilers, SWF obfuscators have been introduced to provide a modicum of security, some produced by decompiler authors themselves. The higher-quality obfuscators use traps for the decompilers, making some fail, but none have definitively been shown to protect all content.

SUMMARY

Conventional mechanisms such as those explained above suffer from a variety of deficiencies. One such deficiency is that in order to have various security features such as confidentiality, integrity, authenticity and replay protection for video files, different options may be taken.

One option is too provide transport level security, using a protocol such as Secure Socket Layer (SSL), and to stream the content over the secure connection. With this arrangement, security is in effect only during the transmission of the content, and is not persistent. Further, with several clients requesting the same content at the same time, the load on the server is increased, because the server needs to establish a separate SSL connection with each client. which reduces throughput or requires additional hardware to scale properly.

Another option is to use encryption to provide confidentiality and to use a digital signature for integrity and non-repudiation. The user of a digital signature requires the entire file to be downloaded, which effects the viewing performance of the file over a network such as the Internet. Since the entire file needs to be downloaded for digital signature verification, if the rendering of the content is provided before the digital signature is verified, there exists the risk of providing incorrect information to the user. Letting the user know the signature is invalid after the user has consumed the file is not very useful.

Embodiments of the invention significantly overcome such deficiencies and provide mechanisms and techniques that provide confidentiality, integrity and authenticity, since the security is made a part of the file format. The present security method for video files (e.g., flash video files) is applicable to files viewed in various scenarios, for example in video which is downloaded and viewed, in video which is streamed over a network and in real time streaming video. The present security method for video files also allows for random access of the video file. The video comprises a plurality of packets, and each packet is made standalone. All the information necessary to decrypt the packet is made a part of the packet. When a client requests a stream of data beginning at a random point of time in the video, an index of the packet sequence numbers is accessed and is used to provide packets from that point forward. The server can start streaming the video from that selected point forward, and client can ensure that the server is streaming from the point requested and that no man-in-the-middle (MITM) attacks were launched. In cryptography, a man-in-the-middle attack is an attack in which an attacker is able to read, insert and modify at will, messages between two parties without either party knowing that the link between them has been compromised. The attacker is be able to observe and intercept messages going between the two victims.

In a particular embodiment of a method of providing confidentiality, integrity and authenticity for a video file, the method includes producing an encryption header for the video file, the video file including a plurality packets that carry content, the encryption header containing information necessary to successfully decrypt the video file. Additionally, the method includes adding the encryption header to the video file. The method further includes generating an encryption key from a master key identified in the encryption header and encrypting, using the encryption key, individual packets of the video file that carry content.

In an alternate embodiment, a method of viewing an encrypted video file includes receiving at least a first portion of an encrypted video file, the encrypted video file providing confidentiality, integrity and authenticity. The method also includes receiving an encryption header contained in the at least a portion of the encrypted video file. The method further includes generating a decryption key from a master key identified in the encryption header and decrypting, using the decryption key, encrypted packets of the encrypted video file.

Other embodiments include a computer readable medium having computer readable code thereon for providing confidentiality, integrity and authenticity for a video file. The medium includes instructions for producing an encryption header for the video file, the video file including a plurality packets that carry content, the encryption header containing information necessary to successfully decrypt the video file. The medium further includes instructions for adding the encryption header to the video file, and instructions for generating an encryption key from a master key identified in the encryption header. Further the medium includes instructions for encrypting, using the encryption key, individual packets of the video file that carry content.

Yet another embodiment includes a computer readable medium having computer readable code thereon for viewing an encrypted video file. The medium includes instructions for receiving at least a first portion of an encrypted video file, the encrypted video file providing confidentiality, integrity and authenticity and instructions for receiving an encryption header contained in the at least a portion of the encrypted video file. The medium also includes instructions for generating a decryption key from a master key identified in the encryption header, and instructions for decrypting, using the decryption key, encrypted packets of the encrypted video file.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides persistent security for a video file and/or viewing of an encrypted video file as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing persistent security for a video file and/or viewing of an encrypted video file as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems, Incorporated of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

While the present examples and description refer to a FLV file, it should be understood that the present method and apparatus for providing persistent security is applicable to other types of video files as well.

Figure 1:
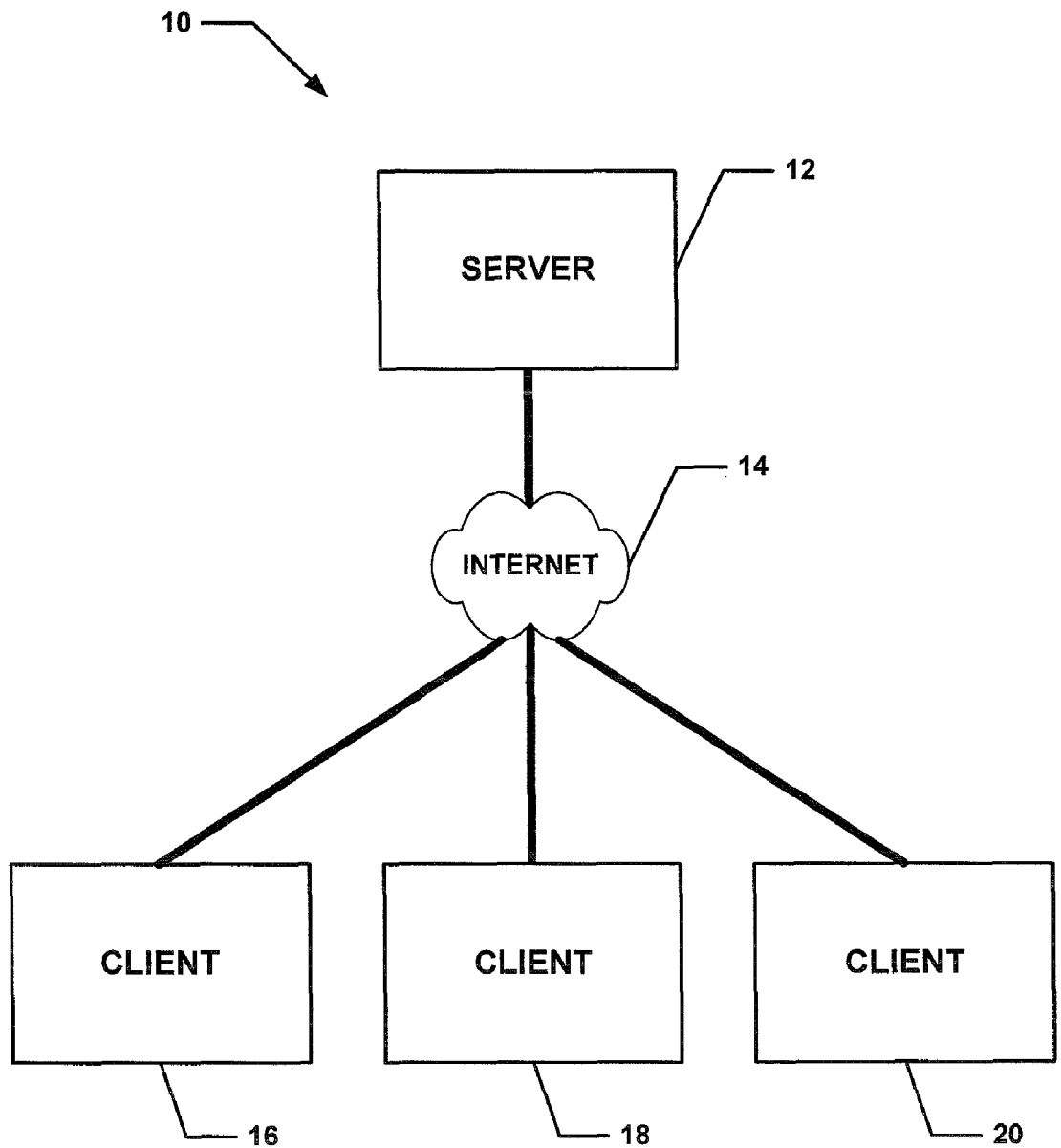
FIG. 1 illustrates an example video server/client environment.

FIG. 1 depicts an example video server environment 10. The environment 10 includes a video server 12 which communicates with clients 16, 18 and 20 through a communications network 14, such as the Internet. Clients communicate requests for video content (e.g. an FLV file) to the video server 12, and the video server 12 responds by providing the requested content to the server that made the request. The content can be provided as pre-recorded streaming video, live streaming video or streaming video from a selected point in the video.

Figure 2:
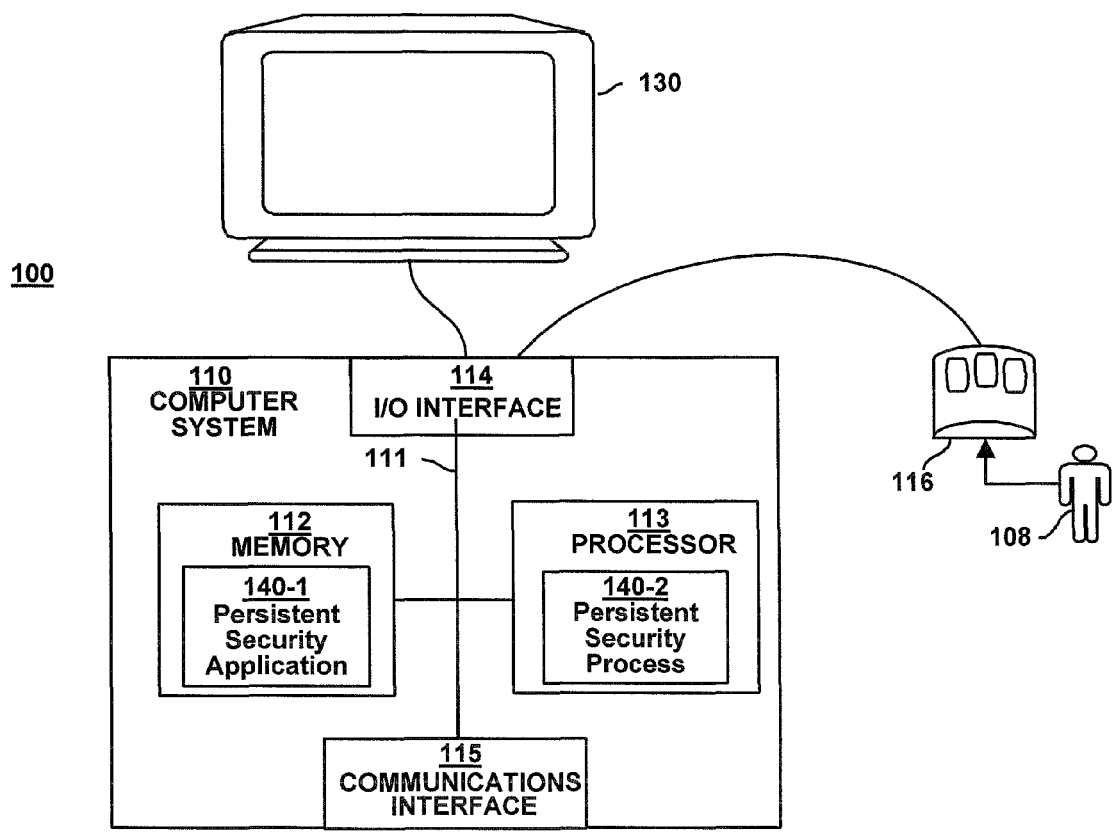
FIG. 2 illustrates an example computer system architecture for a computer system that performs video encryption in accordance with embodiments of the invention.

FIG. 2 is a block diagram illustrating an example computer system 100 (e.g., video server 12 and/or video clients 16, 18 or 20 as shown in FIG. 1) for implementing persistent security function 140 and/or other related processes to carry out the different functionality as described herein.

As shown, computer system 100 of the present example includes an interconnect 111 that couples a memory system 112 and a processor 113 an input/output interface 114, and a communications interface 115.

As shown, memory system 112 is encoded with persistent security application 140-1. Persistent security application 140-1 can be embodied as software code such as data and/or logic instructions (e.g., code stored in the memory or on another computer readable medium such as a disk) that support functionality according to different embodiments described herein.

During operation, processor 113 of computer system 100 accesses memory system 112 via the interconnect 111 in order to launch, run, execute, interpret or otherwise perform the logic instructions of the persistent security application 140-1. Execution of persistent security application 140-1 produces processing functionality in persistent security process 140-2. In other words, the persistent security process 140-2 represents one or more portions of the persistent security application 140-1 (or the entire application) performing within or upon the processor 113 in the computer system 100.

It should be noted that, in addition to the persistent security process 140-2, embodiments herein include the persistent security application 140-1 itself (i.e., the un-executed or non-performing logic instructions and/or data). The persistent security application 140-1 can be stored on a computer readable medium such as a floppy disk, hard disk, or optical medium. The persistent security application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of persistent security application 140-1 in processor 113 as the persistent security process 140-2. Those skilled in the art will understand that the computer system 100 can include other processes and/or software and hardware components, such as an operating system that controls allocation and use of hardware resources associated with the computer system 100.

In order to provide persistent security for a video file (e.g., an FLV file) an encryption header is created, which contains information that will be utilized by the decryptor to successfully decrypt the FLV. The encryption header contains encryption metadata such as the encryption algorithm, key length, and master key identifier.

In a particular embodiment the encryption header is added as a new data type to the FLV File body, right after the FLV Header. As the encryption header is at the beginning of the file right after the FLV header, it's available to the decryptor before any encrypted content is encountered.

Next, an encryption key is generated from a master encryption key. Following this, the individual packets that carry the content are encrypted using the encryption key. If a packet needs to be encrypted (for efficiency only certain packets maybe encrypted), then encryption is applied to the packet as dictated by the encryption algorithm. While applying the encryption, all the metadata (e.g. whether it's an audio/video frame, keyframe/iframe, codec type) are kept in clear so that the client side players can do intelligent processing, without the need to decrypt the content. The packet contains an indicator that certain pre-processing is required. Non-compliant video players would not recognize the indicator and therefore not be able to decrypt the packet.

Additional headers contain additional header elements, necessary to process the rest of the FLV. The encryption header is one such additional entry that is present in the additional header section. The encryption header contains the information that is needed to successfully decrypt the encrypted parts of FLV. One place to put the additional header entries is in the FLV Header, taking advantage of the extensibility feature present in the FLV header section.

The Encryption Header contains the metadata needed to successfully decrypt the content. This includes the string encryption method and parameters specific to the string encryption method. There are at least two methods of obtaining the master secret, use of an online key agreement negotiation protocol (e.g., Adobe Policy Server available from Adobe Systems, Incorporated), and 'External' wherein the key is provided by the application. For external key information, the master secret is provided by the application. The application can determine which key is to be used for the decryption. The Id property allows multiple keys to be used, and the encryptor can identify which one of the multiple keys to be used during decryption.

In certain embodiments it may be desired to keep a portion of the content unencrypted, so that if the content is played in video players that don't have encryption support, some information can be provided to the user regarding necessary steps to be taken. As a corollary, if the same content is played in players that have encryption support, they should skip through the instructional part of the file, and directly go to the "real" content. The mechanism is preferably generic, so that whenever additional capabilities are added to the FLV format, it can be used to provide custom message to users regarding the need to upgrade to a new version of FLV player.

For example if support is added for encrypted high definition audio, a custom message can be included for players not equipped to handle high definition audio to say the file contains encrypted content and the later version of player needs to be used, whereas another custom message can be included for the video player, such that it contains high definition audio in addition to standard MP3 audio hence for optimal performance the latest version of video player should be used, but is not required.

The above content is authored such that enough information is given to the end user regarding the steps they should take to view the content successfully. The content should be a self contained infinite loop, because right after the unencrypted content will be encrypted content, that the non compliant video players won't be able to understand anyway. The non-compliant video players should never see the encrypted packets.

It is desirable to have complete integrity protection and replay protection (when FLV is streamed), within the file format itself. That way FLV can be transmitted over insecure medium and still be secure and highly performing, compared to when transport level security (e.g. SSL) is used to achieve the same level of security.

One scheme for integrity protection is use of a digital signature however a digital signature only provides protection when individual packets are replayed, not when the entire content is replayed. Further, digital signatures in the conventional form suffer from the fact that entire file must be available before the digital signature can be verified. This might work for FLVs that are available locally, but won't work when FLVs are streamed.

One solution is to provide partial integrity verification, i.e. each packet/message is verified individually. This has to be tied with replay protection, such that the individual packets can't be replayed maliciously. This provides an incremental signature verification that will work with streaming FLVs too, and will perform well with locally stored FLVs as well.

However, providing replay protection when there's random access within FLVs is challenging. For providing replay protection when there's random access, there has to be a way for the client to request specific parts of a file, and for the client to cryptographically verify that the exact part of the file that was requested has been served.

One way to achieve all the above goals is to have a unique 64-bit sequence number for each packet/message that is non-disposable. For space efficiency, these sequence number are not stored inside the packet, rather computed at the two ends, with sequence numbers starting from 0 and incremented by 1 for each packet (except for disposable ones). This provides raw integrity and replay protection.

To accommodate random access of FLVs, an index of 'anchors' is stored within the FLV (these anchors point to the keyframes, which can be randomly seeked to). Along with the file offset for each anchor (for random access), the sequence number is also stored (so that it's integrity can be checked).

The sequence number is part of an authentication code computed for each packet, and if the computation fails, that means, either a packet/message has been dropped or is being replayed. Thus all the packet/messages that are processed are guaranteed to be authentic and played in order.

Figure 3:
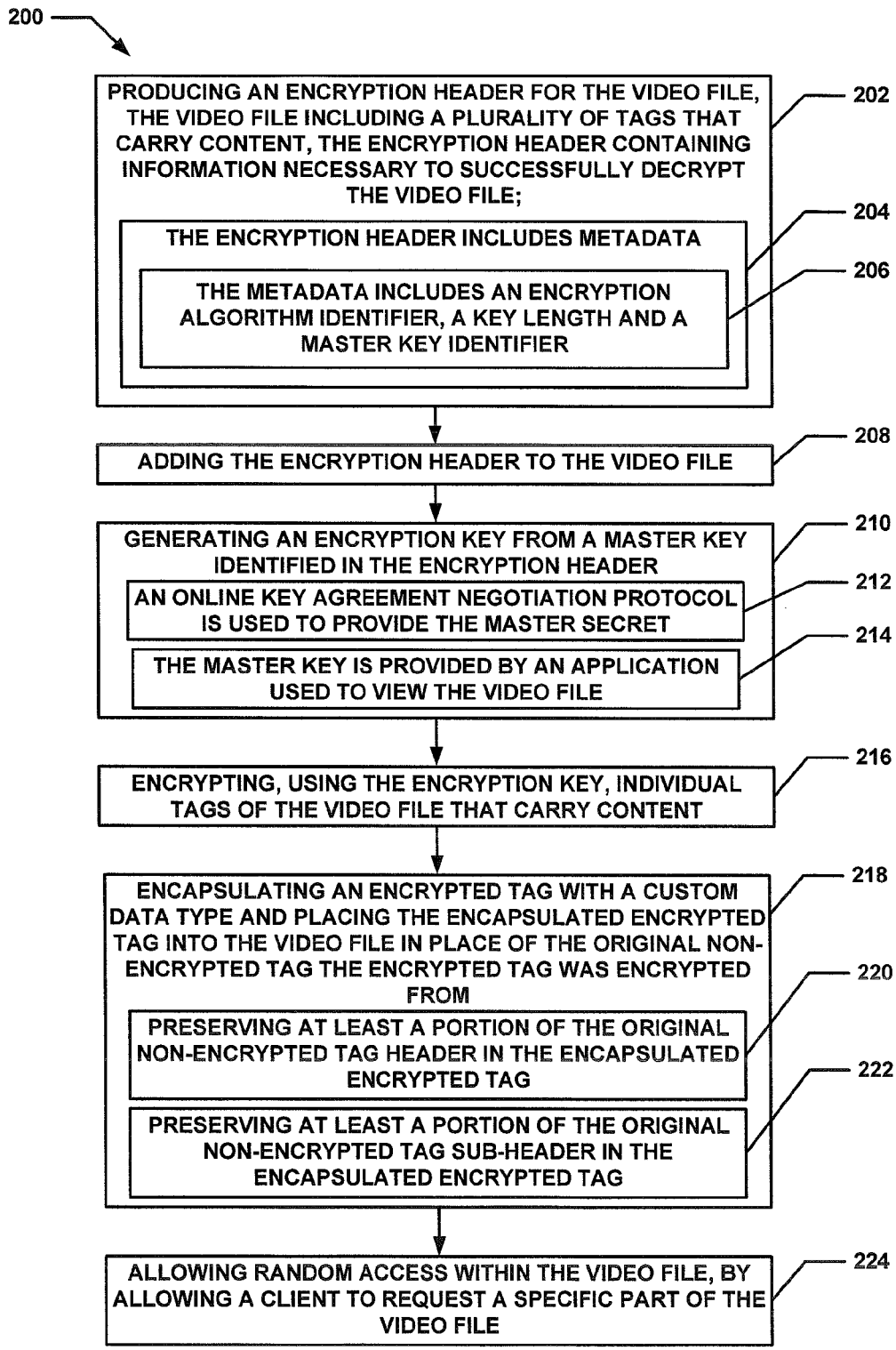
FIG. 3 is a flow diagram of a particular embodiment of a method of providing confidentiality, integrity and authenticity for a video file in accordance with embodiment of the invention.
Figure 4:
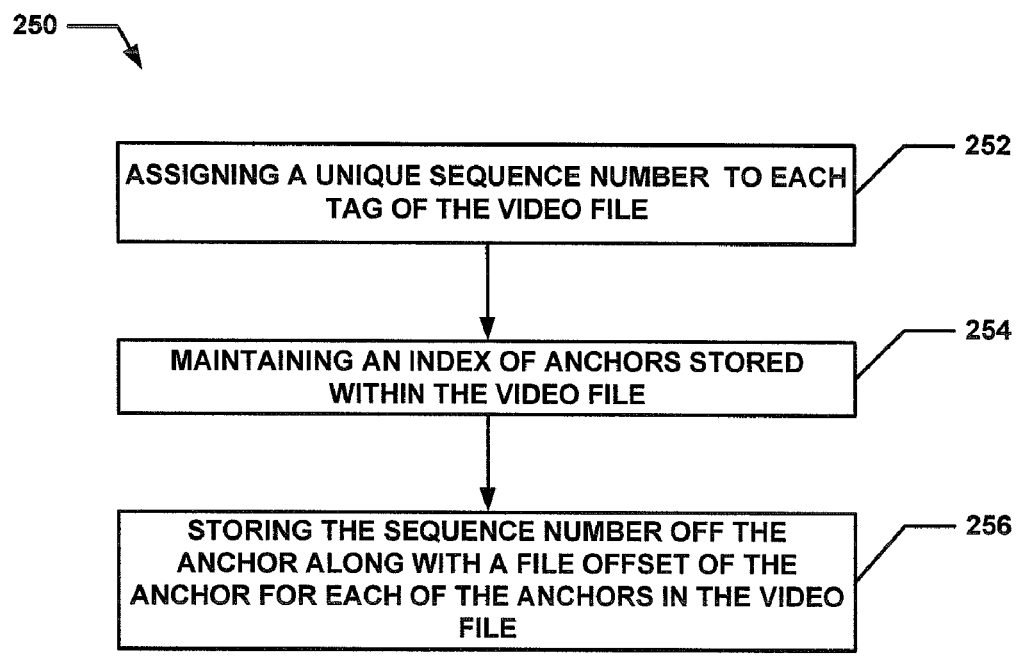
FIG. 4 is a flow diagram of a particular embodiment of a method of permitting random access of a video file in accordance with embodiment of the invention.
Figure 5:
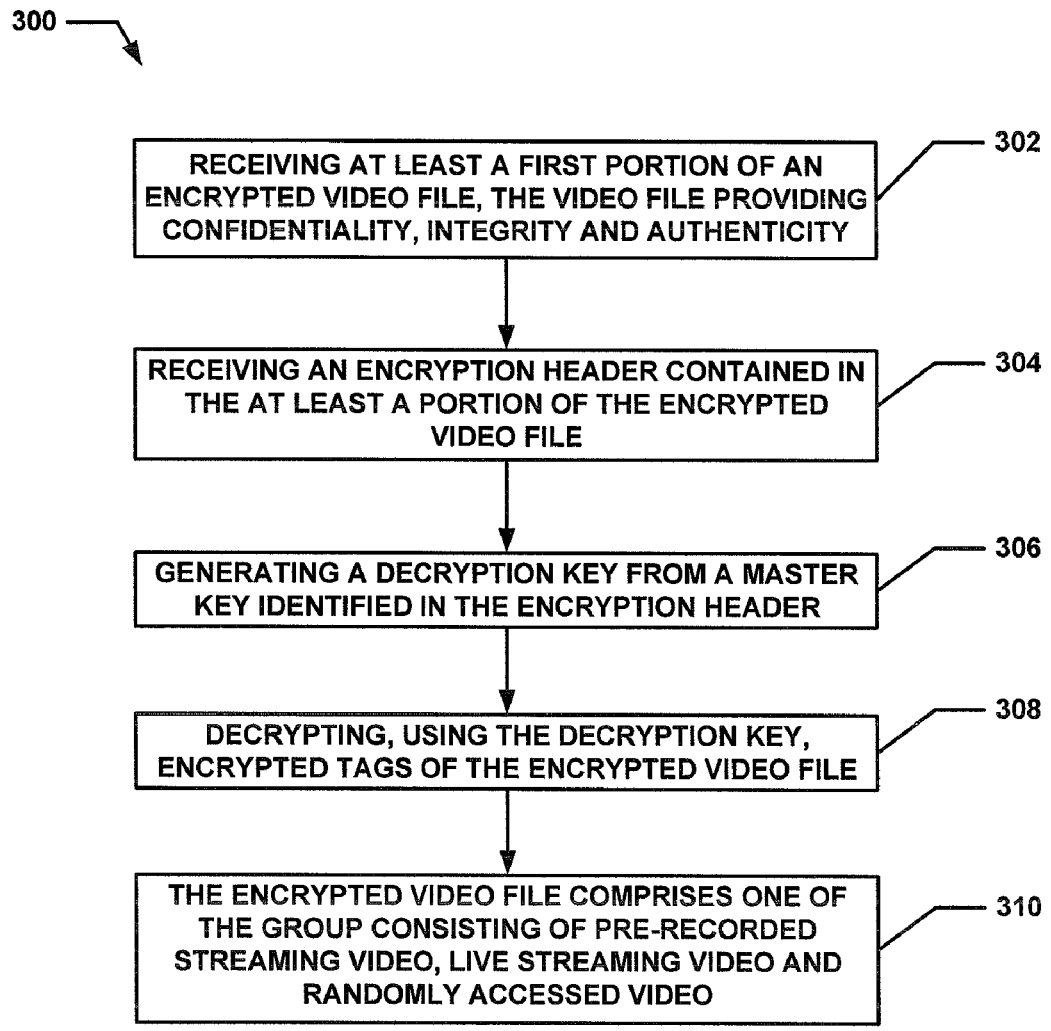
FIG. 5 is a flow diagram of a particular embodiment of a method of performing decryption of a video file in accordance with embodiment of the invention.

Flow charts of example embodiments of the presently disclosed methods are depicted in FIGS. 3-5. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 200 of providing confidentiality, integrity and authenticity for a video file is shown. The method 200 begins with processing block 202 which discloses producing an encryption header for the video file, the video file including a plurality packets that carry content, the encryption header containing information necessary to successfully decrypt the video file. The video file includes one of pre-recorded streaming video, live streaming video and randomly accessed video. As shown in processing block 204, the encryption header includes metadata. As further shown in processing block 206, the metadata includes an encryption algorithm identifier, a key length and a master key identifier.

Processing block 208 states adding the encryption header to the video file. In a particular embodiment the encryption header is added as to the FLV File body, right after the FLV Header. As the encryption header is at the beginning of the file right after the FLV header, it's available to the decryptor before any encrypted content is encountered.

Processing continues with processing block 210 which recites generating an encryption key from a master key identified in the encryption header. In one embodiment, as shown in processing block 212, an online key agreement negotiation protocol is used to provide the master secret. In another embodiment, shown in processing block 214, the master key is provided by an application used to view the video file.

Processing block 216 recites encrypting, using the encryption key, individual packets of the video file that carry content. In certain embodiments it may be desired to keep a portion of the content unencrypted, so that if the content is played in players that don't have encryption support, some information can be provided to the user regarding necessary steps to be taken.

Processing block 218 discloses encapsulating an encrypted packet and placing the encapsulated encrypted packet into the video file in place of the original non-encrypted packet the encrypted packet was encrypted from. This may further include, as shown in processing block 220, preserving at least a portion of the original non-encrypted packet header in the encapsulated encrypted packet and, as shown in processing block 222.

Processing block 224 states allowing random access within the video file, by allowing a client to request a specific part of the video file. For providing replay protection when there's random access, there has to be a way for the client to request specific parts of a file, and for the client to cryptographically verify that the exact part of the file that was requested has been served.

Referring now to FIG. 4, a particular embodiment of a method 250 allowing random access within the video file, by allowing a client to request a specific part of the video file is shown. The method 250 begins with processing block 252 which recites assigning a unique sequence number to each packet of the video file.

Processing block 254 states maintaining an index of anchors stored within the video file. Processing block 256 recites storing the sequence number of the anchor along with a file offset of the anchor for each of the anchors in the video file. To accommodate random access of FLVs, an index of anchors is stored within the video file (these anchors point to the keyframes, which can be randomly seeked to). Along with the file offset for each anchor (for random access), the sequence number is also stored (so that it's integrity can be checked).

Referring now to FIG. 5 a particular embodiment of a method 300 of viewing an encrypted video file is shown. The method begins with processing block 302 which discloses receiving at least a first portion of an encrypted video file, the video file providing confidentiality, integrity and authenticity. Processing block 304 states receiving an encryption header contained in the at least a portion of the encrypted video file.

Processing continues with processing block 306 which recites generating a decryption key from a master key identified in the encryption header. Processing block 308 discloses decrypting, using the decryption key, encrypted packets of the encrypted video file. As shown in processing block 310, the encrypted video file comprises one of the group consisting of pre-recorded streaming video, live streaming video and randomly accessed video.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
producing an encryption header for a video file, said video file including a plurality of packets that carry content, said encryption header containing information necessary to successfully decrypt said video file;
adding said encryption header to said video file;
generating an encryption key from a master key identified in said encryption header;
encrypting, using said encryption key, individual packets of said video file that carry content to produce an encrypted video file; and
allowing random access within said encrypted video file.

2. The method of claim 1 wherein said encryption header includes metadata.

3. The method of claim 2 wherein said metadata includes an encryption algorithm identifier, a key length and a master key identifier.

4. The method of claim 1 further comprising encapsulating an encrypted packet with a custom data type and placing said encapsulated encrypted packet into the video file in place of the original non-encrypted packet said encrypted packet was encrypted from.

5. The method of claim 4 further comprising preserving at least a portion of said original non-encrypted packet header in said encapsulated encrypted packet.

6. The method of claim 4 further comprising preserving at least a portion of said original non-encrypted packet sub-header in said encapsulated encrypted packet.

7. The method of claim 1 wherein an online key agreement negotiation protocol is used to provide said master key.

8. The method of claim 1 wherein said master key is provided by an application used to view said video file.

9. The method of claim 1 wherein said allowing random access within said encrypted video file comprises:
assigning a unique sequence number to each packet of said encrypted video file;
maintaining an index of anchors stored within said encrypted video file; and
storing the sequence number of the anchor along with a file offset of the anchor for each of said anchors in said encrypted video file.

10. The method of claim 1 wherein said encrypted video file comprises one of the group consisting of pre-recorded streaming video, live streaming video and randomly accessed video.

11. The method of claim 1 further comprising ensuring data integrity for said encrypted video file, wherein said ensuring data integrity comprises:
computing a unique sequence number for each packet of said encrypted video file, wherein said sequence number identifies a sequential order for each packet;
assigning said unique sequence number to each packet of said encrypted video file;
using said unique sequence number to verify that each packet has been received in said sequential order.

12. The method of claim 11 further comprising providing replay protection for said encrypted video file, wherein said providing replay protection comprises using said unique sequence number as part of an authentication code to verify that said packet has not previously been received by client.

13. A method of viewing an encrypted video file, the method comprising:
receiving at least a first portion of an encrypted video file;
receiving an encryption header contained in said at least a portion of said encrypted video file;
generating a decryption key from a master key identified in said encryption header; and
decrypting, using said decryption key, randomly-accessed encrypted packets of said encrypted video file.

14. The method of claim 13 wherein said encrypted video file comprises one of the group consisting of pre-recorded streaming video, live streaming video and randomly accessed video.

15. A non-transitory computer readable medium having computer readable code thereon for providing persistent security for a video file, the medium comprising:
instructions for producing an encryption header for said video file, said video file including a plurality of packets that carry content, said encryption header containing information necessary to successfully decrypt said video file;
instructions for adding said encryption header to said video file;
instructions for generating an encryption key from a master key identified in said encryption header;
instructions for encrypting, using said encryption key, individual packets of said video file that carry content to produce an encrypted video file; and
instructions for allowing random access within said encrypted video file, by allowing a client to request a specific part of said encrypted video file.

16. The non-transitory computer readable medium of claim 15 wherein said encrypted video file comprises one of the group consisting of pre-recorded streaming video, live streaming video and randomly accessed video.

17. The non-transitory computer readable medium of claim 15 wherein said encryption header includes metadata.

18. The non-transitory computer readable medium of claim 17 wherein said metadata includes an encryption algorithm identifier, a key length and a master key identifier.

19. The non-transitory computer readable medium of claim 15 further comprising instructions for encapsulating an encrypted packet with a custom data type and instructions for placing said encapsulated encrypted packet into the video file in place of the original non-encrypted packet said encrypted packet was encrypted from.

20. The non-transitory computer readable medium of claim 19 further comprising instructions for preserving at least a portion of said original non-encrypted packet header in said encapsulated encrypted packet.

21. The non-transitory computer readable medium of claim 19 further comprising instructions for preserving at least a portion of said original non-encrypted packet sub-header in said encapsulated encrypted packet.

22. The non-transitory computer readable medium of claim 15 wherein an online key agreement negotiation protocol is used to provide said master key.

23. The non-transitory computer readable medium of claim 15 wherein said master key is provided by an application used to view said video file.

24. The non-transitory computer readable medium of claim 15 wherein said instructions for allowing random access within said encrypted video file comprises:
   instructions for assigning a unique sequence number to each packet of said encrypted video file;
   instructions for maintaining an index of anchors stored within said encrypted video file; and
   instructions for storing the sequence number off the anchor along with a file offset of the anchor for each of said anchors in said encrypted video file.

25. A non-transitory computer readable medium having computer readable code thereon for viewing an encrypted video file, the medium comprising:
   instructions for receiving at least a first portion of an encrypted video file;
   instructions for receiving an encryption header contained in said at least a portion of said encrypted video file;
   instructions for generating a decryption key from a master key identified in said encryption header; and
   instructions for decrypting, using said decryption key, randomly-accessed encrypted packets of said encrypted video file.

26. A computer system comprising:
   a memory;
   a processor;
   a communications interface;
   an interconnection mechanism coupling the memory, the processor and the communications interface; and
   wherein the memory is encoded with an application providing persistent security for a video file, that when performed on the processor, provides a process for processing information, the process causing the computer system to perform the operations of:
   producing an encryption header for said video file, said video file including a plurality packets that carry content, said encryption header containing information necessary to successfully decrypt said video file;
   adding said encryption header to said video file;
   generating an encryption key from a master key identified in said encryption header;
   encrypting, using said encryption key, individual packets of said video file that carry content to produce an encrypted video file; and
   allowing random access within said encrypted video file.

27. A computer system comprising:
   a memory;
   a processor;
   a communications interface;
   an interconnection mechanism coupling the memory, the processor and the communications interface; and
   wherein the memory is encoded with an application viewing an encrypted video file, that when performed on the processor, provides a process for processing information, the process causing the computer system to perform the operations of:
   receiving at least a first portion of an encrypted video file;
   receiving an encryption header contained in said at least a portion of said encrypted video file;
   generating a decryption key from a master key identified in said encryption header; and
   decrypting, using said decryption key, randomly-accessed encrypted packets of said encrypted video file.

* * * * *

UNITED STATES PATENT AND TRADEMARK OFFICE
CERTIFICATE OF CORRECTION

| | | |
|---|---|---|
| PATENT NO. | : 8,005,216 B1 | Page 1 of 1 |
| APPLICATION NO. | : 11/842709 | |
| DATED | : August 23, 2011 | |
| INVENTOR(S) | : Agrawal | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this
Eighth Day of November, 2011

David J. Kappos
*Director of the United States Patent and Trademark Office*

UNITED STATES PATENT AND TRADEMARK OFFICE
Certificate

Patent No. 8,005,216 B1                                                                                 Patented: August 23, 2011

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: Sunil Agrawal, Milpitas, CA (US); and Xuejun Xu, Cupertino, CA (US).

Signed and Sealed this Seventeenth Day of July 2012.

Kambiz Zand
                                                                      Supervisory Patent Examiner
                                                                                Art Unit 2434
                                                                       Technology Center 2400